US012579461B1

(12) United States Patent
Yamasaki et al.

(10) Patent No.: US 12,579,461 B1
(45) Date of Patent: Mar. 17, 2026

(54) MODULAR QUANTUM COMPUTING SYSTEM WITH AN OPTICAL LINK AND COMPUTING REGION

(71) Applicant: Nanofiber Quantum Technologies, Inc., Tokyo (JP)

(72) Inventors: Hayata Yamasaki, Tokyo (JP); Shinichi Sunami, Tokyo (JP)

(73) Assignee: Nanofiber Quantum Technologies, Inc., Tokyo (JP)

( * ) Notice: Subject to any disclaimer, the term of this patent is extended or adjusted under 35 U.S.C. 154(b) by 94 days.

(21) Appl. No.: 18/602,799

(22) Filed: Mar. 12, 2024

(51) Int. Cl.
  *G06N 10/70* (2022.01)
  *G06N 10/20* (2022.01)

(52) U.S. Cl.
  CPC ............. *G06N 10/70* (2022.01); *G06N 10/20* (2022.01)

(58) Field of Classification Search
  CPC ............................. G06N 10/70; G06N 10/20
  USPC ......................................................... 714/785
  See application file for complete search history.

(56) References Cited

U.S. PATENT DOCUMENTS

| | | | | |
|---|---|---|---|---|
| 7,019,875 B2 * | 3/2006 | Pittman | .................. | B82Y 10/00 359/107 |
| 11,501,198 B1 * | 11/2022 | Birchall | .................. | G06N 10/40 |
| 2007/0133798 A1 * | 6/2007 | Elliott | .................... | H04B 10/70 398/189 |

| | | | | |
|---|---|---|---|---|
| 2020/0401927 A1 * | 12/2020 | Nickerson | .............. | G06N 10/40 |
| 2023/0042201 A1 * | 2/2023 | Raussendorf | .......... | G06E 3/001 |
| 2023/0393447 A1 * | 12/2023 | Thompson | ............. | G06N 10/40 |

FOREIGN PATENT DOCUMENTS

| | | |
|---|---|---|
| JP | 2016153850 A | 8/2016 |
| JP | 2023055195 | 3/2020 |
| WO | 2022009950 A1 | 1/2022 |

OTHER PUBLICATIONS

C.-L. Hung et al. "Quantum spin dynamics with pairwise-tunable, long-range interactions", PNAS, Aug. 5, 2016, pp. E4946-E4955, 113 (34), www.pnas.org/cgi/doi/10.1073/pnas.1603777113.

L.-M. Duan et al. "Robust quantum gates on neutral atoms with cavity-assisted photon scattering", The American Physical Society, Sep. 28, 2005, pp. 032333-1-032333-4, 72, DOI: 10.1103/PhysRevA. 72.032333.

(Continued)

*Primary Examiner* — James C Kerveros
(74) *Attorney, Agent, or Firm* — Richard T. Ogawa; Ogawa P.C.

(57) ABSTRACT

In an example, the present invention provides a modular quantum computer system. The system has at least one quantum computer cell system. In an example, the system has a plurality of qubits comprising a laser coolable atom, ion, nitrogen vacancy center, silicon color center or qubit systems with an optical control capability, such that a number of the qubits range from one to 100,000, among others. In an example, the quantum computer cell system has an optical link. The optical link has a photon collection system or a pair of optical mirrors characterized by a mirror reflectivity >90% and configured to form a cavity, the cavity having a length, e.g., ranging from 1 micrometer to 1 centimeter or longer.

30 Claims, 4 Drawing Sheets

(56) References Cited

OTHER PUBLICATIONS

L.-M. Duan et al. "Scalable Photonic Quantum Computation through Cavity-Assisted Interactions", The American Physical Society, Mar. 26, 2004, pp. 127902-1-127902-4, vol. 92, No. 12, DOI: 10.1103/ PhysRevLett.92.127902.

H. J. Briegel et al. "Quantum Repeaters: The Role of Imperfect Local Operations in Quantum Communication", The American Physical Society, Dec. 28, 1998, vol. 81, No. 26, pp. 5932-5935.

Hayato Goto et al., "Fault-tolerant quantum computation with probabilistic two-qubit gates", The American Physical Society, Phyiscal Review A 80, Oct. 20, 2009, pp. 1-4, DOI: 10.1103/ PhysRevA.80.040303.

Naomi H. Nickerson et al., "Freely Scalable Quantum Technologies Using Cells of 5-to-50 Qubits with Very Lossy and Noisy Photonic Links", The American Physical Society, Phyiscal Review X 4, Dec. 9, 2014, pp. 1-17, DOI: 10.1103/PhysRevX.4.041041.

Hayata Yamasaki et al., "Time-Efficient Constant-Space-Overhead Fault-Tolerant Quantum Computation", Nature Physics, Jan. 16, 2024, vol. 20, pp. 247-253, https://doi.org/10.1038/s41567-023-02325-8.

E. Knill, "Quantum Computing with Very Noisy Devices", Nov. 2, 2004, pp. 1-47, arXiv:quant-ph/0410199v2.

A. M. Steane, "Simple quantum error-correcting codes", The American Physical Society, Phyiscal Review A, Dec. 1996, pp. 4741-4751, vol. 54, No. 6.

A. Yu Kitaev, "Fault-tolerant quantum computation by anyons", Jul. 9, 1997, pp. 1-27, arXiv:quant-ph/9707021v1.

Alexy A. Kovalev et al., "Fault tolerance of quantum low-density parity check codes with sublinear distance scaling", The American Physical Society, Phyiscal Review A 87, Feb. 28, 2013, pp. 1-5, DOI: 10.1103/PhysRevA.87.020304.

* cited by examiner

MODULAR QUANTUM COMPUTING SYSTEM WITH AN OPTICAL LINK AND COMPUTING REGION

BACKGROUND OF INVENTION

The present invention relates generally to distributed quantum computing and quantum repeater techniques. In particular, the present invention provides method including an optical link for a quantum computing device. Merely by way of example, the invention can be applied to a variety of applications such as secure communication, cryptography, drug discovery, optimization, machine learning and artificial intelligence, finance, weather forecasting, chemical, mechanical, electrical, civil, nuclear fusion and fission, economics, materials, and any other complex human or non-human matters.

Quantum computing is a type of computing that utilizes quantum mechanics to perform certain tasks more efficiently than classical computing. In classical computing, bits can exist in one of two states, either 0 or 1, but in quantum computing, qubits can exist in a superposition of 0 and 1 states. This and other quantum mechanical effects such as entanglement allow quantum computers to perform certain calculations substantially faster than classical computers, such as factorization of large numbers, optimization problems, and simulations of quantum systems.

However, both quantum computing and quantum repeater also have some drawbacks. One major challenge is that qubits are highly susceptible to noise and decoherence, which can cause errors in the computation and repeater operations. Therefore, quantum computers and repeaters require careful error mitigation and correction techniques to maintain the accuracy of the computation by precise control and detection of individual qubits on demand. Specifically, error mitigation and correction operations often result in overhead cost when scaled to large-scale distributed quantum computing architecture.

From the above, it is seen that techniques for improving scalability of error-corrected quantum computing and quantum repeater are desired.

SUMMARY OF INVENTION

According to the present invention, techniques generally related to quantum computing and quantum repeater are provided. In particular, the present invention provides an optical tweezer system and method including high resolution imaging system for trapping and controlling atoms and a pair of reflectors to enable an optical cavity for a quantum computing and repeater device. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters.

In an example, the present invention provides a quantum computer system. The system has at least one quantum computer cell system. In an example, the quantum computer cell system has an optical link module. In an example, the optical link has a pair of optical mirrors characterized by a mirror reflectivity >90% and configured with a reflecting surface facing each other to form a cavity, the cavity having a length, e.g., ranging from 1 micrometer to 1 centimeter or longer. In an alternative example, the optical link consists of high numerical aperture photon collection device. In an example, the system has a plurality of qubits comprising a laser coolable atom, ion, nitrogen vacancy center, silicon color center or qubit systems with an optical control capability, such that a number of the qubits range from one to 100,000, among others. In an example, the system has an optical interconnect coupled to the optical link module. In an example, the system has a photon multiplexer device coupled to the optical interconnect. The photon multiplexer device is configured to change at least two or more photons in one or more different spatial modes into two or more photons configured in a single spatial mode.

In an example, the system has a free space computing module in a computing region. The free space computing module has a plurality of atoms, each of the atoms being trapped in an optical tweezer. In an example, the optical tweezer is configured to move to transport one of more of the atoms from a first spatial location to a second spatial location. In an example, the system has a detection system operably coupled to the link and the computing region and configured to collect one or more fluorescence photons to be sent to a camera or a detector with a quantum efficiency, e.g., 0.1 or higher. In an example, the system has an electrical computing system comprising an information processing unit configured to process a qubit state information captured from the camera or the detector.

In an example, the invention provides an alternative quantum computer system. The system has at least one quantum computer cell system. The quantum computer cell system has an optical link. In an example, the optical link has at least a pair of optical mirrors characterized by a mirror reflectivity >90% and configured to form a cavity, the cavity having a length ranging from 1 micrometer to 1 centimeter or longer. In an alternative example, the optical link consists of high numerical aperture photon collection device. The optical link has a plurality of qubits comprising a laser coolable atom, ion, nitrogen vacancy center, silicon color center or qubit systems with an optical control capability, e.g., a number of the qubits range from one to 100,000. In an example the optical link has an optical interconnect coupled to the link module and a photon multiplexer device coupled to the optical interconnect, the photon multiplexer device configured to change at least two or more photons in one or more different spatial modes into two or more photons configured in a single spatial mode.

In an example, the system has a quantum computing module configured in a computing region, the quantum computing module having a plurality of ions. The system has a detection system operably coupled to the cavity or the computing region and configured to collect one or more fluorescence photons to be sent to a camera or a detector with a quantum efficiency of 0.1 or higher and an electrical computing system comprising an information processing unit configured to process a qubit state information captured from the camera or the detector.

Depending upon the example, the present invention can achieve one or more of these benefits and/or advantages. In an example, the present invention provides a quantum computing device that performs error-corrected operations in a modular and a scalable manner. In an example, the device uses conventional optical techniques, and is compact and efficient. In an example, the present invention offers advantages of generating outputs that are reliable and efficient. These and other benefits and/or advantages are achievable with the present device and related methods. Further details of these benefits and/or advantages can be found throughout the present specification and more particularly below.

BRIEF DESCRIPTION OF FIGURES

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE EXAMPLES

According to the present invention, techniques generally related to quantum computing and quantum repeater are provided. In particular, the present invention provides an optical link for a distributed quantum computing and repeater device. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters.

Figure 1:
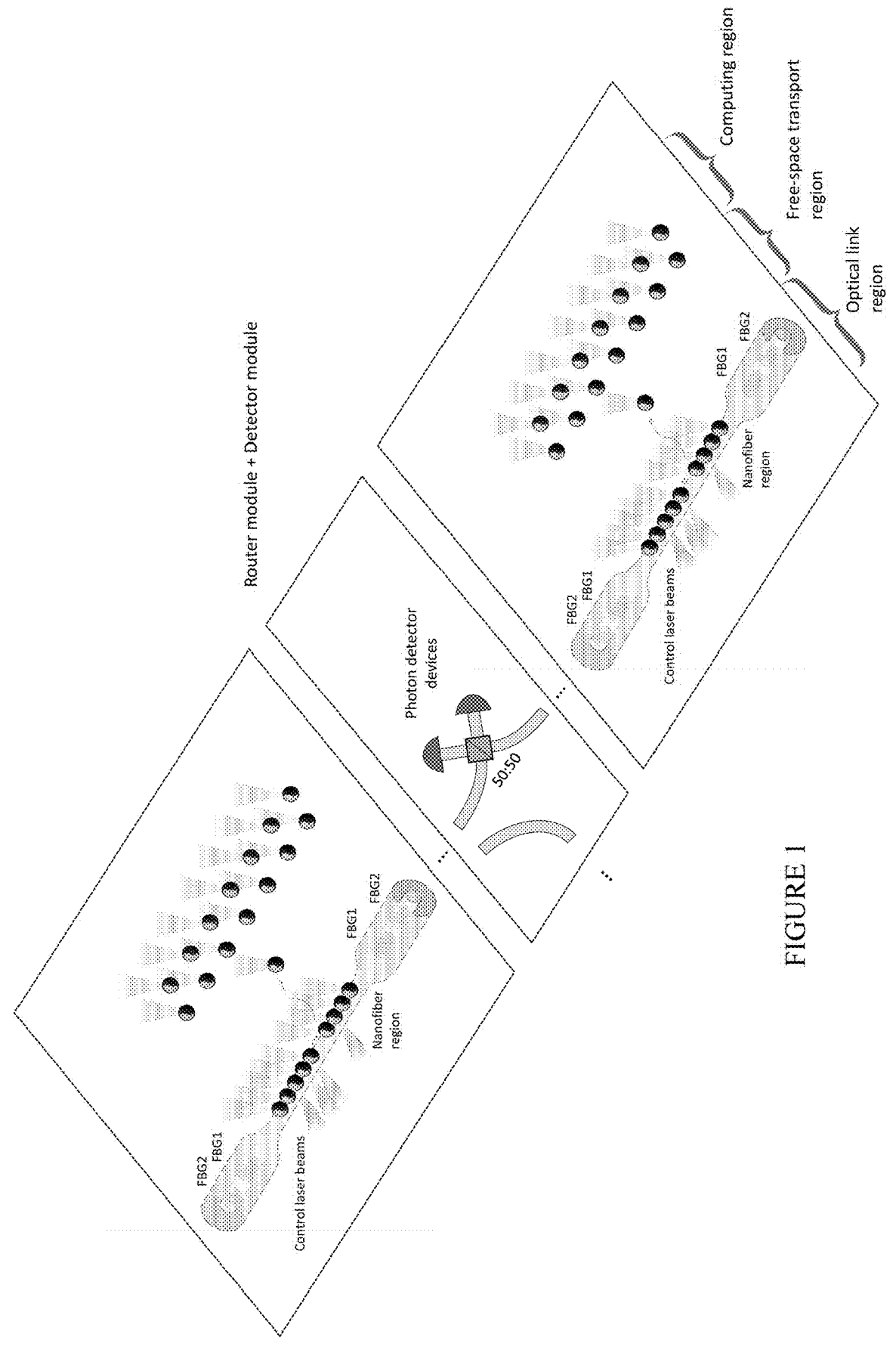
FIG. 1 is a simplified diagram illustrating an implementation of quantum computing cell device according to an example.

FIG. 1 is a simplified diagram illustrating a quantum computing cell device according to an example. The system comprises of optical cavity made of two mirrors, both having high reflectivity of 90% or above and may have different reflectivity. The computing cell device further comprises qubits with optical control and readout capability, such as neutral atoms trapped in optical tweezer array, ions in electromagnetic traps or vacancy centers of bulk material, with optically accessible qubit states and transitions.

Figure 2:
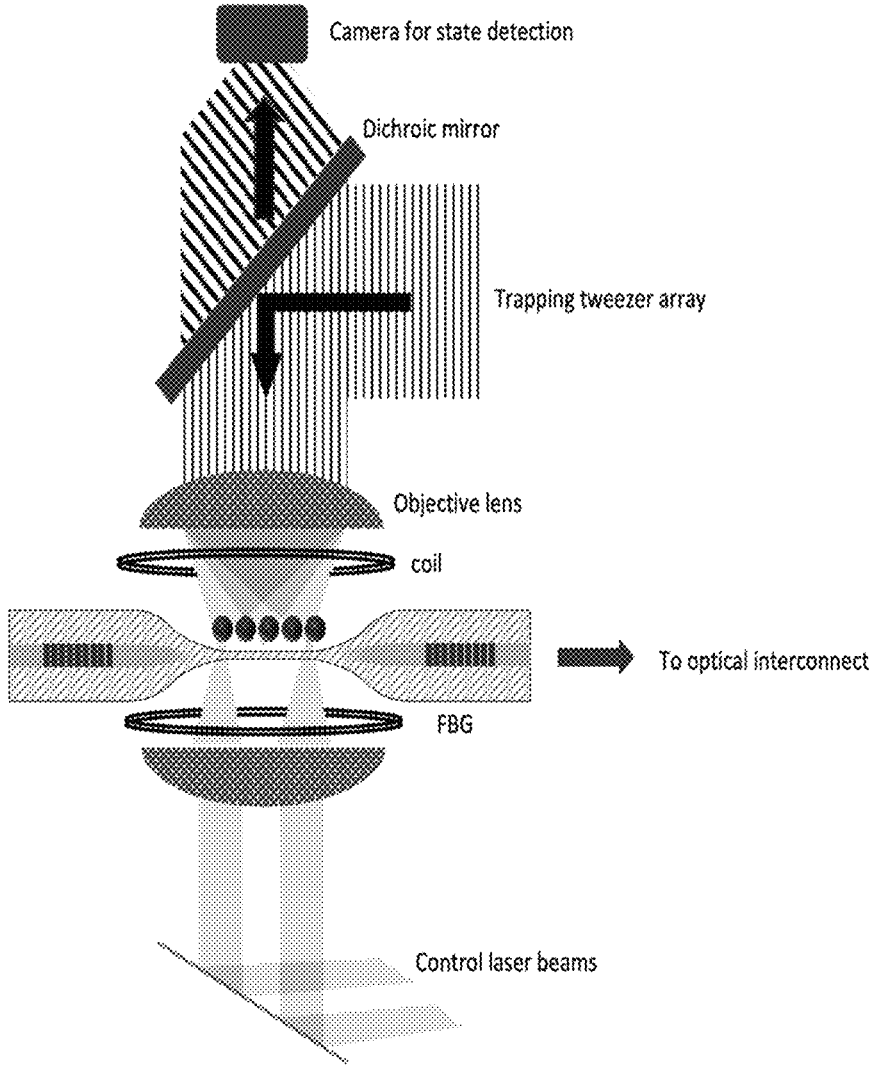
FIG. 2 is a more detailed diagram illustrating a quantum computing cell device according to an example of the present invention.

FIG. 2 is a simplified diagram illustrating the quantum computing cell device according to an example of the present invention. Two objective lenses are located above and below the link and computing module, such that the field of view covers computing and link modules. One objective lens is used to focus an array of optical tweezers, coupled by a dichroic mirror with a high-resolution imaging system comprising of high quantum efficiency camera, along with addressable control laser beam to control the quantum state of the atom qubits. The other objective lens is used to focus an array of laser beams addressing each tweezer site, with individual frequency control. In addition, optical interconnect with other cavities and single-photon generators and detectors are included. A network comprises of link modules, single-photon sources (similar cavity quantum electrodynamics, QED, system, semiconductor single-photon emitter, nitrogen vacancy (NV) center, ion trap), optical fiber, optical router (optical switches), photon detector, polarization beam splitter and other optical components.

Figure 3:
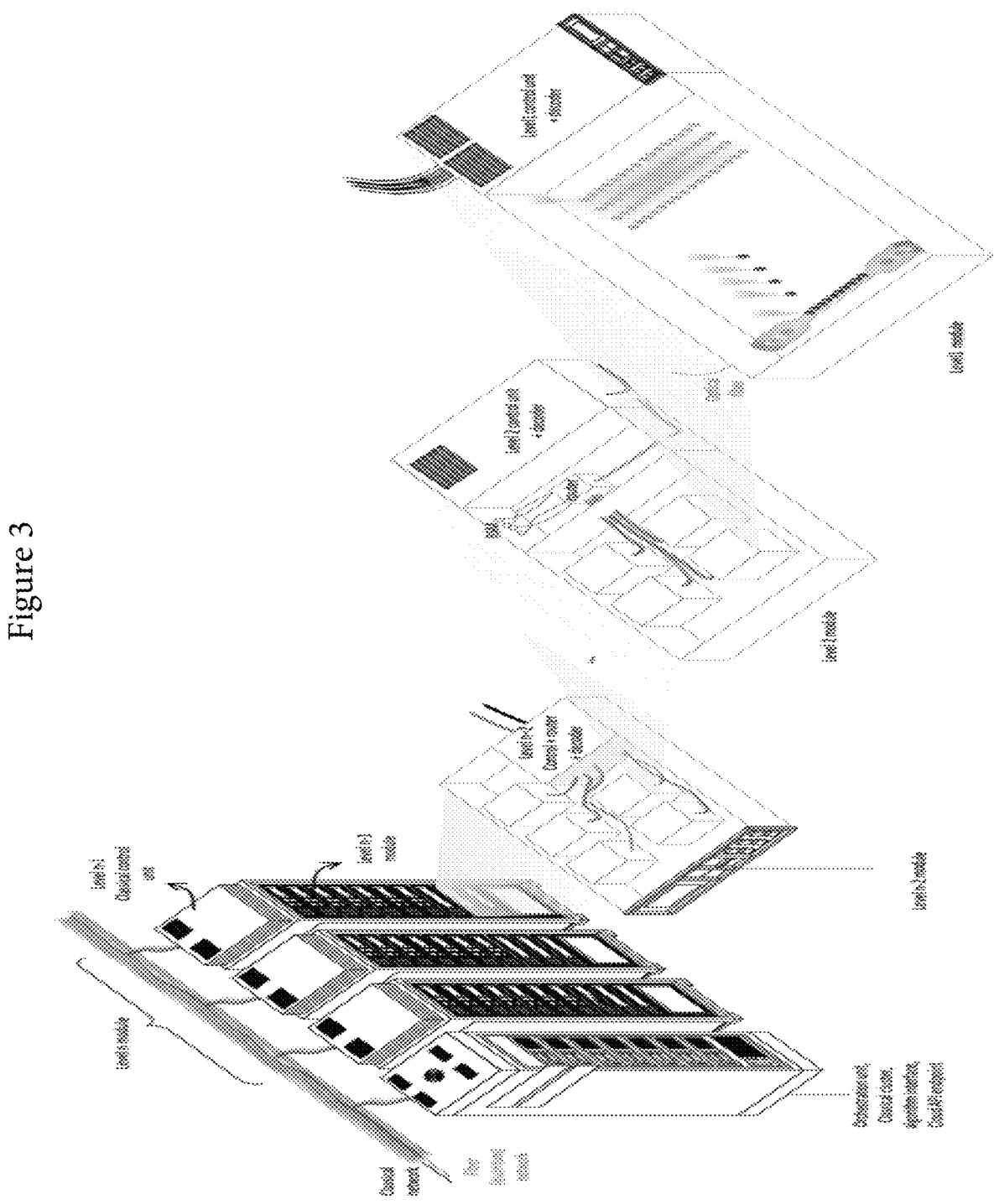
FIG. 3 is a simplified diagram illustrating a recursive encoding architecture of quantum computing cell device according to an example.

FIG. 3 is a simplified diagram illustrating the overall recursive modular architecture. The lowest level module, level-1 module is a single quantum computer cell system, comprising of link region, transport region and computing regions. A free space region is also shown. The qubits in computing region may be partitioned into gate, storage and other sections, where gate section is designed for parallel multi-qubit gates while storage section is designed to ensure long qubit coherence time by shielding from external field fluctuations. The qubits in level-1 unit constitute one or more encoded logical qubits (level-1 logical qubits) which continuously operates quantum error correction, controlled by the level-1 classical control and decoding unit.

The level-2 modules comprise of two or more level-1 modules connected by optical interconnect. The one or more logical qubits of level-1 modules are re-encoded into one or more logical qubits, such that the error rates are suppressed further from the level-1 logical qubits. The gate operations between qubits in separate level-1 modules are performed by gate teleportations or related methods [1,2]. The overall systems are controlled by level-2 classical control unit, which compiles logical qubit operations into instructions for the level-1 classical control unit, and performs quantum error decoding operations for the level-2 logical qubits.

Higher-level modules at level n comprise of two or more level n−1 modules, where level-n logical qubits are realized by performing error correction on the level-n−1 logical qubits. At the highest level, a classical user interface module is added to facilitate the programming of the computing system, cloud endpoint operation, quantum algorithm interface or large-scale classical computing operations for quantum-classical hybrid computing.

Figure 4:
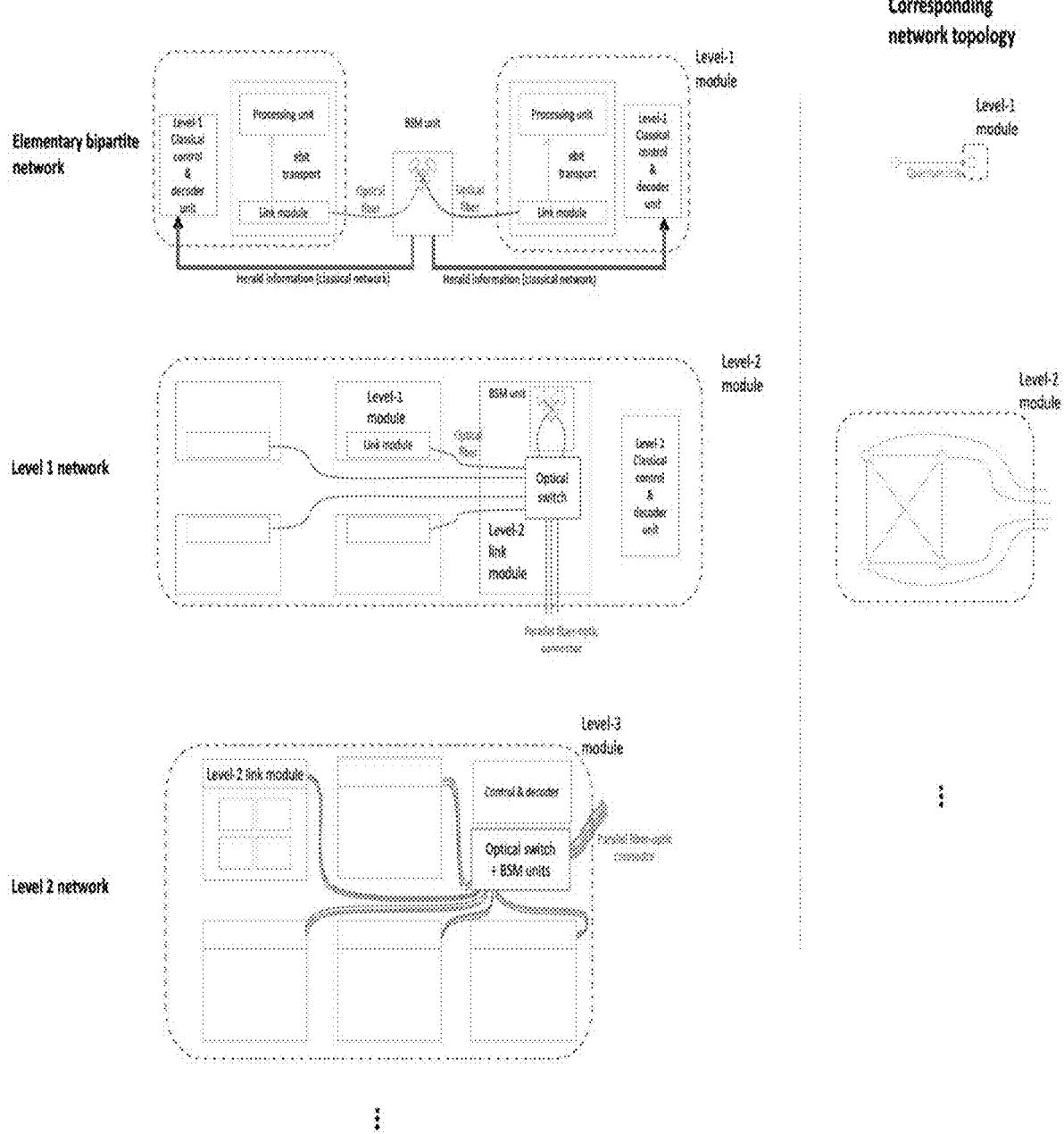
FIG. 4 is a simplified diagram illustrating the network topology of the fiber-optic and classical link network according to an example.

FIG. 4 is a simplified diagram illustrating the network topology of the fiber-optic and classical link network. The elementary bipartite network consists of two level-1 units and a beam splitter measurement (BSM) unit. The BSM unit performs the measurement of incoming photons from two fiber-optic inputs, which are interfered at the beam splitter or polarization beam splitter and measurement using the single-photon detectors (SPDs). The photon detection pattern at the SPDs heralds the successful generation of the entangled qubit pair (ebit), the pair consisting of two qubits in different level-1 modules. As illustrated, the ebits are transported to the processing unit where local quantum error correction operation (level-1) is performed, to enable the level-2 quantum error correction by gate teleportation.

As illustrated in FIG. 4, level-2 module consists of two or more level-1 modules, fiber-optic switches, BSM unit and level-2 classical control and decoding unit. The fiber-optic connector of each level-1 unit is connected to the fiber-optic switch, such that the switch directs two incoming photon pulses to the BSM unit for heralded entanglement generation or related methods. The network topology, illustrated on the right, is a fully-connected graph with all nodes in the graph possessing the edge directed outside of the level-2 module, which constitutes high-density optical connection cable that facilitates the networking of two or more level-2 modules.

Such a construction can be recursively iterated to construct two or more levels of module networks. The concatenated error correction operations ensure fast suppression of the operation and idle errors [3].

In an example, the present invention provides a quantum computer system. The system has at least one quantum computer cell system. In an example, the quantum computer cell system has an optical link. The optical link has at least a pair of optical mirrors characterized by a mirror reflectivity >90% and configured to form a cavity, the cavity having a length, e.g., ranging from 1 micrometer to 1 centimeter or longer. In an alternative example, the optical link comprises of high numerical aperture photon collection device. In an example, the system has a plurality of qubits comprising a laser coolable atom, ion, nitrogen vacancy center, silicon color center or qubit systems with an optical control capability, such that a number of the qubits range from one to 100,000, among others. In an example, the system has an optical interconnect coupled to the link module. In an example, the system has a photon multiplexer device coupled to the optical interconnect. The photon multiplexer device is configured to change at least two or more photons in one or more different spatial modes into two or more photons configured in a single spatial mode.

In an example, the system has a free space computing module in a computing region. The computing region has a plurality of atoms, each of the atoms being coupled to an optical tweezer. In an example, the optical tweezer is configured to move to transport one of more of the atoms from a first spatial location to a second spatial location. In an example, the system has a detection system operably coupled to the link and the computing region and configured to collect one or more fluorescence photons to be sent to a camera or a detector with a quantum efficiency, e.g., 0.1 or higher. In an example, the system has an electrical computing system comprising an information processing unit configured to process a qubit state information captured from the camera or the detector.

In an example, the electrical computing system is configured to identify a quantum state of the one or more qubits and configured to decode using the information processing unit a quantum error information from a syndrome measurement results.

In an example, the system further comprises a plurality of electrical coil pairs to control the magnetic field and magnetic field gradient at the location of the qubits.

In an example, the pair of optical mirrors for the optical cavity comprises at least one of a free-space bulk mirror, a fiber-based mirror, or a fiber Bragg grating mirrors. In an example, the plurality of the qubits are coupled to a cavity mode between the two mirrors or within the field of view of high numerical aperture photon collection system and the atoms are in the computing region. In an example, the optical interconnect is coupled to a second link module in the second quantum computer cell system. In an example, the optical interconnect is coupled to at least one or more of a single-photon generator, a photon detector, a network comprising of one or more optical cavities each of which is identical, a single-photon source, a semiconductor single-photon emitter, an optical router, an optical switch, a circulators, a photon detector, an optical homodyne or heterodyne detector, a polarization beam splitter, a coherent light source, a squeezed light source, and an optical homodyne and heterodyne detector.

In an example, the system has a photon detector device configured with the optical interconnect, the photon detector device comprising a 50:50 beam splitter and a pair of single-photon detectors such that an incoming photon pair is measured after an interference operation at the beam splitter. In an example, the system has one or more focused lasers, for a local single qubit control, that is subjected to one or more qubits that have been selected by a spatial addressability of the focused laser, or by a magnetic field generated by a pair of coils to shift a resonance frequency of the one or more qubits.

In an example, at least two of the plurality of atoms, for a local two-qubit control, are configured to operate two-qubit CNOT gates by cavity-mediated photon exchange, Rydberg blockade, interaction through a collective vibrational mode of ion trap, or a method.

In an example, the plurality of qubits are configured to store one or plurality of encoded quantum information as one or more data qubits with a storage time ranging from 1 nanosecond to greater.

In an example, the plurality of qubits are configured to store one or plurality of encoded quantum information as one or more data qubits with a storage time ranging from 1 nanosecond to greater. In an example, the plurality of encoded quantum information is re-encoded into a one or plurality of logical qubits through a concatenated quantum error-correcting code. In an example of such error correcting code is the quantum Hamming codes [3], the quantum Bose-Chaudhuri-Hocquenghem (BCH) codes [4], C4/C6 code [5], the surface code [6] or the high-rate quantum low-density parity-check codes [7].

In an example, at least two of the quantum computing cell systems are connected by the optical interconnect to perform remote entanglement generation between qubits in different cell systems, assisted by the optical cavities, to allow remote quantum gate operations for the concatenated quantum error correction operation.

In an example, the remote entanglement generation is performed by a single-photon generation from the qubits and coincidence detection in the optical interconnect, or the reflection of a photonic qubits at multiple cavities and measurement of the optical qubit, or the detection of transmitted photons through a plurality of cavities, or other related light-assisted entanglement generation methods.

In an example, the system has one or more remote two-qubit gates performed between a pair of logical qubits of at least two quantum computing cell systems by performing a quantum gate teleportation, comprising of one or more local operations and qubits possessing entanglement among the two or plurality of cell systems.

In an example, the plurality of qubits are configured to be transported in and out of the cavity such that an electric field coupling of an individual qubit to the cavity is controlled in intensity from 0 to g_max, where g_max is a maximum at a center of the cavity where the electric field of cavity field has an amplitude at a maximum value or such that atoms move outside of the field of view of the photon collection system (e.g. high numerical aperture objective lens, micro lens array or optical cavities).

In an example, the invention provides a quantum computer system. The system has at least one quantum computer cell system. The quantum computer cell system has an optical link. The optical link has at least a pair of optical mirrors characterized by a mirror reflectivity >90% and configured to form a cavity, the cavity having a length ranging from 1 micrometer to 1 centimeter or longer. In an alternative example, the optical link consists of high numerical aperture photon collection device. The optical link has a plurality of qubits comprising a laser coolable atom, ion, nitrogen vacancy center, silicon color center or qubit systems with an optical control capability, e.g., a number of the qubits range from one to 100,000. In an example the optical link has an optical interconnect coupled to the cavity and a photon multiplexer device coupled to the optical interconnect, the photon multiplexer device configured to change at least two or more photons in one or more different spatial modes into two or more photons configured in a single spatial mode.

In an example, the system has a quantum computing module configured in a computing region, the quantum computing module having a plurality of ions. The system has a detection system operably coupled to the link or the computing region and configured to collect one or more fluorescence photons to be sent to a camera or a detector with a quantum efficiency of 0.1 or higher and an electrical computing system comprising an information processing unit configured to process a qubit state information captured from the camera or the detector.

In an example, the electrical computing system is configured to identify a quantum state of the one or more qubits and configured to decode using the information processing unit a quantum error information from syndrome measurement results.

In an example, the system further comprising a plurality of electrical coil pairs or chip-mounted electrical wires to control the magnetic field and magnetic field gradient at the location of the qubits.

In an example, the pair of optical mirrors comprises at least one of a free-space bulk mirror, a fiber-based mirror, or a fiber Bragg grating mirrors. In an example, a plurality of the qubits are coupled to a cavity mode between the two mirrors or within the field of view of high numerical-aperture photon collection system and the other ions are in the computing region.

In an example, the optical interconnect is coupled to a second link module in the second quantum computer cell system. In an example, the optical interconnect is coupled to at least one or more of a single-photon generator, a photon detector, a network comprising of one or more optical cavities each of which is identical, a single-photon source, a semiconductor single-photon emitter, an optical router, an optical switch, a circulators, a photon detector, an optical homodyne or heterodyne detector, a polarization beam splitter, a coherent light source, a squeezed light source, and an optical homodyne and heterodyne detector.

In an example, the system further comprising a photon detector device configured with the optical interconnect, the photon detector device comprising a 50:50 beam splitter and a pair of single-photon detectors such that an incoming photon pair is measured after an interference operation at the beam splitter.

In an example, the system further comprising one or more focused lasers, for a local single qubit control, that is subjected to one or more qubits that have been selected by a spatial addressability of the focused laser, or by a magnetic field generated by a pair of coils or electrical wires to shift a resonance frequency of the one or more qubits.

In an example, at least two of the plurality of atoms, for a local two qubit control, are configured to operate two-qubit CNOT gates by cavity-mediated photon exchange, Rydberg-blockage based CNOT gates, or a method. In an example, the plurality of qubits are configured to store one or plurality of encoded quantum information as one or more data qubits with a storage time ranging from 1 nanosecond to greater. In an example, the plurality of qubits are configured to store one or plurality of encoded quantum information as one or more data qubits with a storage time ranging from 1 nanosecond to greater, the plurality of encoded quantum information is re-encoded into a one or plurality of logical qubits through a concatenated quantum error-correcting code. In an example, at least two of the quantum computing cell systems are connected by the optical interconnect to perform remote entanglement generation between qubits in a different cell systems, assisted by the optical link module, to allow remote quantum gate operations for the concatenated quantum error correction operation.

In an example, the remote entanglement generation is performed by a single-photon generation from the qubits and coincidence detection in the optical interconnect, or the reflection of a photonic qubits at multiple cavities and measurement of the optical qubit or the detection of transmitted photons through a plurality of cavities, or other related light-assisted entanglement generation methods. In an example, the system further comprising one or more remote two-qubit or multi-qubit gates performed between a pair of logical qubits of at least two quantum computing cell systems by performing a quantum gate teleportation, comprising of one or more local operations.

In an example, the plurality of qubits are configured to be transported in and out of the cavity such that an electric field coupling of an individual qubit to the cavity is controlled in intensity from 0 to g_max, where g_max is a maximum at a center of the cavity where the electric field of cavity field has an amplitude at a maximum value or such that atoms move outside of the field of view of the photon collection system (e.g. high numerical aperture objective lens, micro lens array or optical cavities).

In an example, the cavity is characterized by a cavity mode coupled to a nanofiber region such that one or more atoms are coupled to an evanescent field of the cavity mode near a vicinity of the nanofiber between the pair of mirrors characterizing two fiber Bragg grating mirrors.

Further details of the system can be found in commonly owned patent applications described in U.S. patent application Ser. No. 18/347,121, filed on Jul. 5 2023, commonly assigned, and hereby incorporated by reference herein. Other applications describe various aspects of components are described in U.S. patent application Ser. No. 18/325,901, filed on May 30, 2023, and Ser. No. 18/347,174, filed on Jul. 5, 2023, each of which is commonly assigned, and hereby incorporated by reference herein.

REFERENCES

[1] H. Goto et al. PRA 80, 040303 (R) (2009)
[2] N. Nickerson et al. PRX 4, 041041 (2014)
[3] H. Yamasaki et al. Nat. Phys 20, 247 (2024).
[4] A. Steane, Phys. Rev. A 54, 4741 (1996).
[5] E. Knill, Nature 434, 39 (2005).
[6] A. Kitaev, Ann. Phys. 303, 2 (2003).
[7] A. Kovalev et al., Phys. Rev. A 87, 020304 (R) (2013)

While the above is a full description of the specific examples, various modifications, alternative constructions, and equivalents may be used. As an example, the device can include any combination of elements described above, as well as outside of the present specification. Additionally, the terms first, second, third. and final do not imply order in one or more of the present examples. Therefore, the above description and illustrations should not be taken as limiting the scope of the present invention which is defined by the appended claims.

The invention claimed is:

1. A quantum computer system comprising:
   at least one quantum computer cell system, quantum computer cell system comprising:
   an optical link module comprising:
   an optical cavity comprising at least a pair of optical mirrors comprising a fiber Bragg grating mirror characterized by a mirror reflectivity >90% and configured to form the optical cavity, the optical cavity having a length ranging from 1 micrometer to 1 centimeter or longer;
   a plurality of qubits comprising a laser coolable atom such that a number of the qubits range from one to 100,000;
   an optical interconnect coupled to the link module;
   a photon multiplexer device coupled to the optical interconnect, the photon multiplexer device configured to change at least two or more photons in one or more different spatial modes into two or more photons configured in a single spatial mode;

a computing region comprising a plurality of atoms, each of the atoms being coupled to an optical tweezer that is capable of transporting one or more atoms from a first spatial region to a second spatial region;

a free space between the computing region and the optical link module;

a detection system operably coupled to the cavity or the computing region and configured to collect one or more fluorescence photons to be sent to a camera or a detector; and an electrical computing system comprising an information processing unit configured to process a qubit state information captured from the camera or the detector.

2. The system of claim 1 wherein the electrical computing system is configured to identify a quantum state of the one or more qubits and configured to decode using the information processing unit a quantum error information from syndrome measurement results.

3. The system of claim 1 further comprising a plurality of electrical coil pairs to control the magnetic field and magnetic field gradient at the location of the qubits.

4. The system of claim 1 wherein the cavity is characterized by a cavity mode coupled to a nanofiber region such that one or more atoms are coupled to an evanescent field of the cavity mode near a vicinity of the nanofiber between the pair of mirrors characterizing two fiber Bragg grating mirrors.

5. The system of claim 1 wherein a plurality of the qubits are coupled to a link module and one or more other qubits are in the computing region.

6. The system of claim 1 wherein the optical interconnect is coupled to a second link module in the second quantum computer cell system.

7. The system of claim 1 wherein the optical interconnect is coupled to at least one or more of a single-photon generator, a photon detector, a network comprising of one or more optical cavities each of which is identical, a single-photon source, a semiconductor single-photon emitter, an optical router, an optical switch, a circulators, a photon detector, an optical homodyne or heterodyne detector, a polarization beam splitter, a coherent light source, a squeezed light source, an optical homodyne detector or heterodyne detector.

8. The system of claim 1 further comprising a photon detector device configured with the optical interconnect, the photon detector device comprising a beam splitter and a plurality of single-photon detectors such that an incoming photons are measured after an interference at the beam splitter.

9. The system of claim 1 further comprising one or more focused lasers, for a local single qubit control, that is subjected to one or more qubits that have been selected by a spatial addressability of the focused laser, or by a magnetic field generated by a pair of coils to shift a resonance frequency of the one or more qubits.

10. The system of claim 1 wherein at least two of the plurality of atoms, for a local two qubit control, are configured to operate two-qubit CNOT gates by cavity-mediated photon exchange, Rydberg blockade, collisional interaction, or a method.

11. The system of claim 1 wherein the plurality of qubits are configured to store one or plurality of encoded quantum information as one or more data qubits with a storage time ranging from 1 nanosecond to greater.

12. The system of claim 1 wherein the plurality of qubits are configured to store one or plurality of encoded quantum information as one or more data qubits with a storage time ranging from 1 nanosecond to greater, the plurality of encoded quantum information is re-encoded into a one or plurality of logical qubits through a concatenated quantum error-correcting code.

13. The system of claim 1 wherein at least two of the quantum computing cell systems are connected by the optical interconnect to perform remote entanglement generation between qubits in a separate cell systems, assisted by the optical link, to allow remote quantum gate operations for the concatenated quantum error correction operation.

14. The system of claim 13 wherein the remote entanglement generation is performed by a single-photon generation from the qubits and coincidence detection in the optical interconnect, a reflection of a photonic qubits at multiple cavities and measurement of the qubit, or a detection of photons transmitted through one or more optical cavities.

15. The system of claim 1 further comprising one or more remote two-qubit gates performed between a pair of logical qubits of at least two quantum computing cell systems by performing a quantum gate teleportation or photon-assisted remote two-qubit gates.

16. The system of claim 1 wherein the plurality of qubits are configured to be transported in and out of the link module such that an electric field coupling of an individual qubit to the cavity is controlled in intensity from 0 to g_max, where g_max is a maximum at a center of the cavity where the electric field of cavity field has an amplitude at a maximum value, or the qubits move outside of a field of view of a photon collection system.

17. A quantum computer system comprising:

at least one quantum computer cell system, quantum computer cell system comprising:

an optical link module comprising:

an optical cavity comprising at least a pair of optical mirrors comprising a fiber Bragg grating mirror characterized by a mirror reflectivity >90% and configured to form a cavity, the cavity having a length ranging from 1 micrometer to 1 centimeter or longer;

a plurality of qubits comprising a laser coolable atom, ion, nitrogen vacancy center, silicon color center or qubit systems with an optical control capability, such that a number of the qubits range from one to 100,000;

an optical interconnect coupled to the link module;

a photon multiplexer device coupled to the optical interconnect, the photon multiplexer device configured to change at least two or more photons in one or more different spatial modes into two or more photons configured in a single spatial mode;

a quantum computing region having a plurality of atoms;

a free space region between the optical link module and the quantum computing region;

a detection system operably coupled to the link or the computing region and configured to collect one or more fluorescence photons to be sent to a camera or a detector; and an electrical computing system comprising an information processing unit configured to process a qubit state information captured from the camera or the detector.

18. The system of claim 17 wherein the electrical computing system is configured to identify a quantum state of the one or more qubits and configured to decode using the information processing unit a quantum error information from syndrome measurement results.

19. The system of claim 17 further comprising a plurality of electrical coil pairs or chip-mounted electrical wires to control the magnetic field and magnetic field gradient at the location of the qubits.

20. The system of claim 17 wherein the optical interconnect is coupled to a second link module in the second quantum computer cell system.

21. The system of claim 17 wherein the optical interconnect is coupled to at least one or more of a single-photon generator, a photon detector, a network comprising of one or more optical cavities each of which is identical, a single-photon source, a semiconductor single-photon emitter, an optical router, an optical switch, a circulators, a photon detector, an optical homodyne or heterodyne detector, a polarization beam splitter, a coherent light source, a squeezed light source, and an optical homodyne and heterodyne detector.

22. The system of claim 17 further comprising a photon detector device configured with the optical interconnect, the photon detector device comprising a beam splitter and a plurality of single-photon detectors such that incoming photons are measured after an interference at the beam splitter.

23. The system of claim 17 further comprising one or more focused lasers, for a local single qubit control, that is subjected to one or more qubits that have been selected by a spatial addressability of the focused laser, or by a magnetic field generated by a pair of coils or electrical wires to shift a resonance frequency of the one or more qubits.

24. The system of claim 17 wherein at least two of the plurality of atoms, for a local two qubit control, are configured to operate two-qubit CNOT gates by cavity-mediated photon exchange, motional-mode mediated interaction, interaction through a collective vibrational mode of ion trap, or a method.

25. The system of claim 17 wherein the plurality of qubits are configured to store one or plurality of encoded quantum information as one or more data qubits with a storage time ranging from 1 nanosecond to greater.

26. The system of claim 17 wherein the plurality of qubits are configured to store one or plurality of encoded quantum information as one or more data qubits with a storage time ranging from 1 nanosecond to greater, the plurality of encoded quantum information is re-encoded into a one or plurality of logical qubits through a concatenated quantum error-correcting code.

27. The system of claim 17 wherein at least two of the quantum computing cell systems are connected by the optical interconnect to perform remote entanglement generation between qubits in a separate cell systems, assisted by the optical link module, to allow remote quantum gate operations for the concatenated quantum error correction operation.

28. The system of claim 27 wherein the remote entanglement generation is performed by a single-photon generation from the qubits and coincidence detection in the optical interconnect, or a reflection of a photonic qubits at multiple cavities and measurement of the photonic qubits, or a detection of one or more photons transmitted through one or more optical cavities.

29. The system of claim 17 further comprising one or more remote two-qubit gates performed between a pair of logical qubits of at least two quantum computing cell systems by performing a quantum gate teleportation or photon-assisted remote two-qubit gates.

30. The system of claim 17 wherein the plurality of qubits are configured to be transported in and out of the link module such that an electric field coupling of an individual qubit to the cavity is controlled in intensity from 0 to g_max, where g_max is a maximum at a center of the cavity where the electric field of cavity field has an amplitude at a maximum value or such the qubits move outside of a field of view of a photon collection system.

* * * * *